April 14, 1970  L. J. HEWITT  3,505,749

GUIDANCE AND POSITION-ADVISORY METHOD AND SYSTEM

Filed March 22, 1967  3 Sheets-Sheet 1

INVENTOR
LELAND J. HEWITT

BY Burns, Doane, Benedict, Swecker & Mathis

ATTORNEYS

April 14, 1970  L. J. HEWITT  3,505,749
GUIDANCE AND POSITION-ADVISORY METHOD AND SYSTEM
Filed March 22, 1967  3 Sheets-Sheet 3
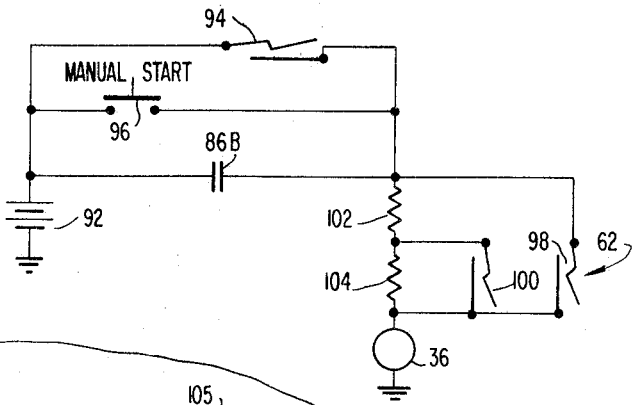
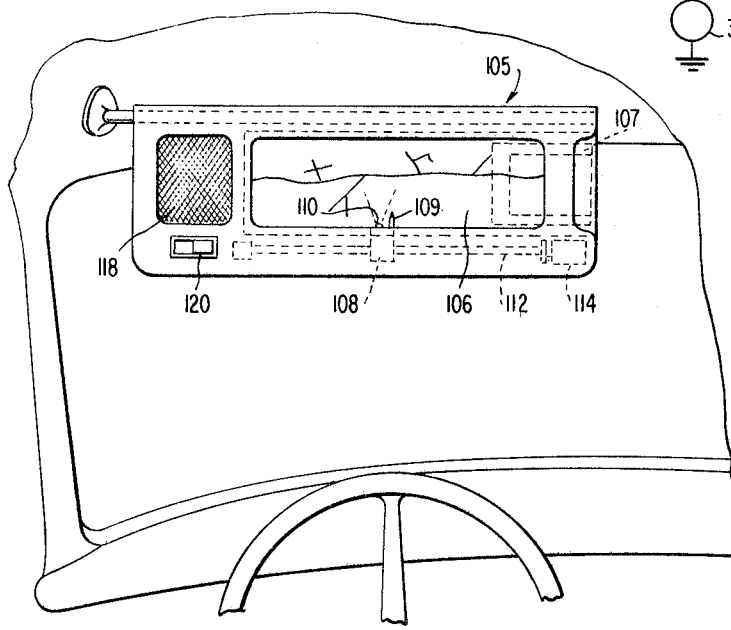
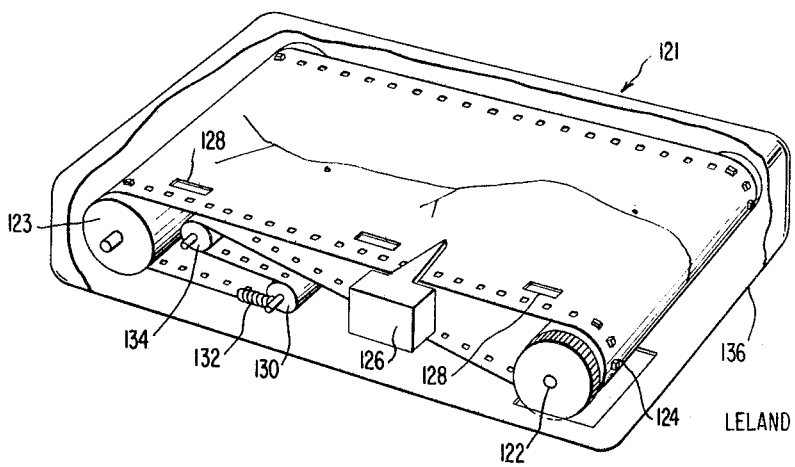
INVENTOR
LELAND J. HEWITT United States Patent Office 3,505,749
Patented Apr. 14, 1970

3,505,749
GUIDANCE AND POSITION-ADVISORY
METHOD AND SYSTEM
Leland J. Hewitt, 9528 Dalegrove,
West Los Angeles, Calif.
Filed Mar. 22, 1967, Ser. No. 625,162
Int. Cl. G09f 27/00
U.S. Cl. 40—28.1                    20 Claims

ABSTRACT OF THE DISCLOSURE

Operation of a tape playback to provide prerecorded guidance information pertinent to a predetermined route is correlated with an indexing traverse of a map of the route. A visual display may present guidance information in response to coded media on the traversed map. Sensors may detect the accomplishment of guidance commands by an operator of a vehicle and advise the operator of incorrect vehicle guidance.

Background of the invention

This invention relates to a method and system for providing visual and audible indications of the actual geographic position of a vehicle along a predetermined route, along with providing guidance commands to assist the vehicle operator in directing the vehicle along the route.

Difficulty is often experienced by the operator of a vehicle when traveling an unknown route. For instance, the driver may be faced with a number of decisions concerning turns along the route, correct speed of travel along different portions of the route, or the correct highway lane positions. Such decisions can usually be made only after time-consuming inspection of a detailed map of the route, and frequent stops along the route are thus often necessary. Further, if a wrong decision is made by the vehicle operator, the mistake may not be realized until substantial travel time has been wasted. Not only does such travel along an unknown route tend to reduce the pleasure of a trip, but tends also to present a safety hazard through hindrance of traffic flow.

Somewhat similar problems are also experienced on tours of areas of particular scenic or historic interest, as often both the driver and the passengers in a vehicle are so involved with determining the correct route to be traveled that they either miss or confuse the full significance of certain sights along the route. Additionally, travel through an unknown area having a large number of interesting locations, as for example a historical battleground having a number of battle sites, is often complicated by the fact that portions of informative literature must be correlated with the particular location of interest and then laboriously read.

Systems have heretofore been developed to provide prerecorded announcements to the passengers of a tour vehicle. However, many of these systems have been dependent upon the odometer of the vehicle for timing purposes and have thus been subject to errors because of route deviations or cumulative odometer inaccuracies. Further, such previously developed systems have generally provided only audible instructional information to the vehicle passengers without providing guidance information to the vehicle operator, and have not provided apparatus for checking the guidance maneuvers of the vehicle in order to assure travel along the correct route.

Summary of the invention

The present invention is directed to a method and apparatus for providing instructional and orientational information pertinent to a number of locations along a predetermined route. Visual and audible information is presented at predetermined locations along the route, providing both the particular geographical position of the location and guidance commands for further travel along the route. When the present invention is utilized in a vehicle, the guidance maneuvers may be sensed and the vehicle operator may be notified of the correctness of each maneuver.

It is thus a principal object of this invention to provide a system for suggesting guidance instructions to the operator of a vehicle.

Another object of this invention is to provide both visual and audible information pertinent to a plurality of different locations along a predetermined route.

Yet another object of the present invention is to monitor the guidance actions of the vehicle operator and to inform the operator both of desirable maneuvers along the route and of the correctness of his past maneuvers.

A still further object of the present invention is to provide a series of guidance instructions to the operator of a vehicle, succeeding instructions not being provided until all the preceding instructions have been correctly accomplished.

Brief description of the drawings

Other objects and intended advantages of this invention will be more readily appreciated as the same become better understood by the reference to the following detailed description in connection with the accompanying sheets of drawings wherein:

FIGURE 4 is a schematic drawing of yet another portion of the system shown in FIGURE 1;

FIGURE 5 illustrates another embodiment of the present invention shown in a typical vehicle installation; and FIGURE 6 is a perspective view of a variation of the map portion of the present invention.

Description of the preferred embodiment

Figure 1:
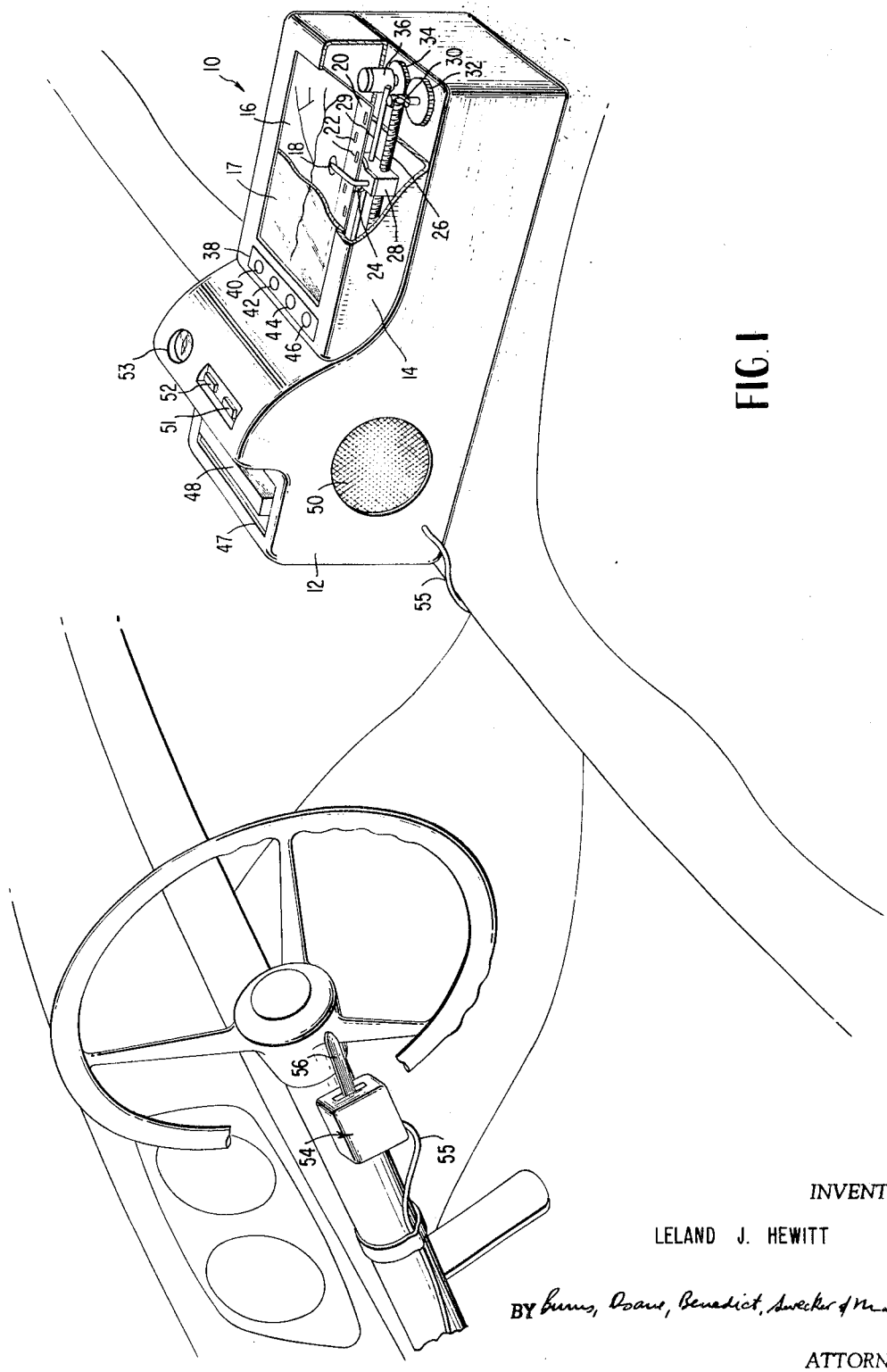
FIGURE 1 is a perspective view, with a partially cutaway portion, of one embodiment of the present vehicle driver command and advisory system shown in a typical vehicle installation.

Referring now to the drawings wherein like reference numbers refer to like and corresponding parts throughout the several figures, one embodiment of the guidance system 10 is illustrated in FIGURE 1. System 10 comprises a main housing 12 which is shaped to serve either as a permanently connected or temporarily installed armrest on the seat of an automobile. A display unit 14 may be rigidly connected to the main housing 12, or may be a removable self-contained unit for positioning in remote locations in the automobile. The display unit 14 comprises a map card 16 which is easily removed or inserted into the unit under a transparent window 17 to present a visible representation of the predetermined route desired to be traveled. Different map cards are to be inserted into the unit for different routes.

An indexing or indicator mechanism 18 is adjacently mounted next to the map card for relative movement to the map card in synchronism with the travel of the automobile in order to indicate the particular location of the automobile along the predetermined route. The indicator 18 may be a mechanical pointer or may include a source of light which indicates the particular vehicle location on the map.

The map card 16 also includes a coded program section 20 which includes a plurality of coded configurations 22 representing guidance commands and the like. These coded configurations may be for instance magnetic ink marks which may be read by a magnetic read head. Alternately, the coded configurations could be pencil marks or other distinguishing coatings that could be read by an optical read head or the like. In the present embodiment, grooves or holes 22 are cut into the map card 16 in predetermined positions in order to operate switch contacts disposed on a reading head 24.

The head 24 may carry a plurality of switch actuators biased mechanically against the map card and tracing seprate parallel paths along the map as the head moves. Each actuator is therefore programmed as desired by the slots in its track on the map card. The switch operated by each of the actuators may be selected as desired, i.e., normally open, normally closed, or double pole, etc., to be closed, opened, or thrown as its actuator encounters a slot in its path, and held in the operated conditions until its actuator arrives at the end of the slot. The switch mechanisms may control the system circuits directly, or by relay operation.

The reading head 24 is mounted below the indicator 18 for relative movement below the program portion 20 of the map card 16. Movement of the indicator 18 and the read head 24 along the edge of the map card 16 is provided by a rotating worm gear 26, which is threadedly connected through a base 28 integrally connected to the indicator 18 and read head 24. A stabilizing bar 29 is slidably disposed through the base 28 so that rotation of the worm gear 26 moves indicator 18 and read head 24 along the edge of the map card 16. The worm gear 26 is rotated by mating pinion gear 30 which is in turn operated by rotation of gears 32 and 34. A small electric motor 36, powered from a suitable voltage source such as a battery or the electric cigarette lighter system in an automobile, serves to operate the gears to move the indicator 18 along the representation of the predetermined route in substantial accordance with the travel of the automobile. As will be discussed in greater detail, operation of the motor 36 may be selectively interrupted and restarted through operation of suitable control circuitry. If desired, the worm gear 26 could alternatively be rotated through a suitable driving connection with the odometer system of the automobile.

Also disposed in the display unit 14 is a driver advisory panel 38. This panel includes a number of indicators which are selectively energized or deenergized to advise the driver of the vehicle of an upcoming guidance maneuver, and of the correctness of his completion of the guidance maneuver. For instance, indicators 40 and 42 may be lamps adapted to be selectively energized from a suitable voltage source to indicate the necessity of making a turn in order to stay upon the predetermined route. Upon a successful completion of the desired turn maneuver, the indicator 44 may then indicate that the vehicle is on course. If the driver of the vehicle fails to make the correct turn, the indicator 46 may then be energized to indicate that the vehicle is off the predetermined course. Of course, it will be realized that numerous other guidance indications may be provided to the driver; the illustrated indicators being exemplary.

A conventional tape playback system 47 is disposed in a recessed back portion of the main body 14. This playback system includes a record magnetic tape cartridge 48 of the type commonly known and which is replaceable with other cartridges in order that various prerecorded instructional and orientational information may be provided to the occupants of the vehicle through the speaker 50 located on the side of the main body 12. If desired, other speakers could be utilized to accommodate a stereo playback system.

Playback system 47 comprises one of a number of commercially available systems and may be operated by a small electric motor (not shown), which draws power from a suitable power source such as the electric cigarette lighter receptacle of an automobile. Other sound reproducing systems could also be utilized in the present invention, such as a disc phonograph or magnetic wire system. The operation of the present sound reproduction system may be controlled in accordance with the correctness of the accomplishment by the operator of a vehicle of the coded guidance commands on the audio-tape or card map 16, as will be more fully explained later.

Suitably located on top of the main body 12 are a set of push button switches, of which button 51 may be operated to start and stop the system and button 52 may be operated to initiate the reset mechanism of the system to be later described. A compass 53 may also be provided on the system to provide additional orientation information to the vehicle operator. Suitable electronic control circuitry, to be later described, may be disposed in the housing 12 under the buttons 51 and 52.

A turn sensor 54 may be suitably mounted by clamps on the steering column of the automobile in order to provide indications of the guidance of the vehicle to the electrical circuitry in housing 12. A resilient projection 56 extending from the sensor 54 is positioned so that rotation of the vehicle steering wheel causes the projection 56 to be contacted and moved by a portion of the steering wheel. For instance, accomplishment of a right turn of the vehicle would cause the projection 56 to be moved a short distance to the right. Suitable relay contacts located in the sensor 54 may be closed by movement of the projection 56, to provide signals of the vheicle guidance in a manner to be more fully described.

It is apparent that other constructions of a turn sensor could also be advantageously utilized in the present invention. For instance, a similar relay contact closing switch could be mechanically linked directly to the vehicle steering mechanism as a factory installation. Alternatively, gradients of color could be disposed on the steering wheel which could be sensed by a suitable photodiode and light source configuration to provide an accurate indication on the relative position of the wheel. Direction indicating devices such as accelerometers or gyroscopes may also be utilized as accurate guidance sensors in the present invention.

Figure 2:
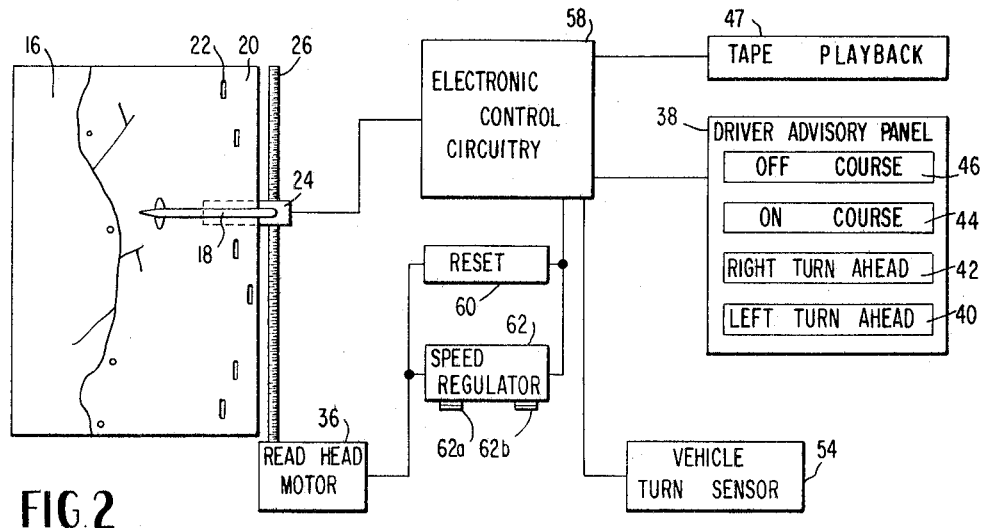
FIGURE 2 is a block diagram of the basic components of the embodiment shown in FIGURE 1.

FIGURE 2 is a block diagram of the present guidance system wherein like numerals are utilized to indicate parts previously described. During the traverse of the coded program portion 20 of the map card 16 by the reading head 24, signals representative of the coded information are supplied from the reading head 24 to the electronic control circuitry 58. Upon receipt of a particular coded signal, the circuitry 58 may actuate one of the turn indicators 40 or 42 on the driver advisory panel 38. This indication will serve to warn the driver of the vehicle that a turn should be made. Further the circuitry 58 may actuate the tape playback 47 in order to present an audible instruction program section to the driver regarding the upcoming turn to be made.

The turn sensor 54 senses the occurrence and the direction of a guidance maneuver by the vehicle operator. If the correct vehicle turn is accomplished by the operator, the energized turn indicator will be extinguished, and the on-course indicator 44 will visually indicate the correct performance to the vehicle operator. However, if an incorrect turn is made, the off-course indicator 46 will be energized, as will appear below.

If a particular guidance command presented to the vehicle operator is incorrectly performed, the system will be de-energized until reset by operation of the reset circuitry 60. Energization of the reset circuitry may for instance reverse the operation of motor 36 in order to reposition the indicator 18 and the read head 24 in a desired position after the operator has correctly repositioned the automobile along the predetermined route. A mechanism in the reset circuitry may also reposition the record tape 48 to the desired former position.

The speed at which motor 36 translates the indicator 18 and the read head 24 along the map card 16 may be geared to a set speed which is a predetermined average speed for the particular route being traveled. Alternatively, the motor 36 may be operated at varying speeds by a speed regulator circuit 62, so that the indicator 18 is moved along the representation of the predetermined route at a slow rate for heavy traffic areas, a medium rate for average cross-town streets, and a relatively high cruise speed for throughways and the like. The speed regulator 62 may be provided with buttons 62a and 62b which may be manually operated by the vehicle driver in order to control the speed of the present system in accordance with particular traffic conditions experienced.

The coded media portion 20 of the map card 16 may be provided with coded index points at which the electronic control circuitry 58 will discontinue operation on the read head motor 36 until a predetermined maneuver is performed by the vehicle operator or until the reset circuitry 60 is operated. Such index points allow the driver of the automobile to compensate for any unexpected deviations from the predetermined route or for unusual traffic conditions and the like.

Although in the present embodiment only the provision of guidance commands pertaining to left or right turns has been illustrated, it will be understood that guidance information could be provided relative to small angle turns, increased or decreased vehicle speeds, or complete stopping of the vehicle. Each of these conditions, and others which will be apparent, could be sensed by suitable transducers located in the vehicle so that the correctness of the vehicle operators performance in the car could be visually presented on the driver advisory panel 38.

Figure 3:
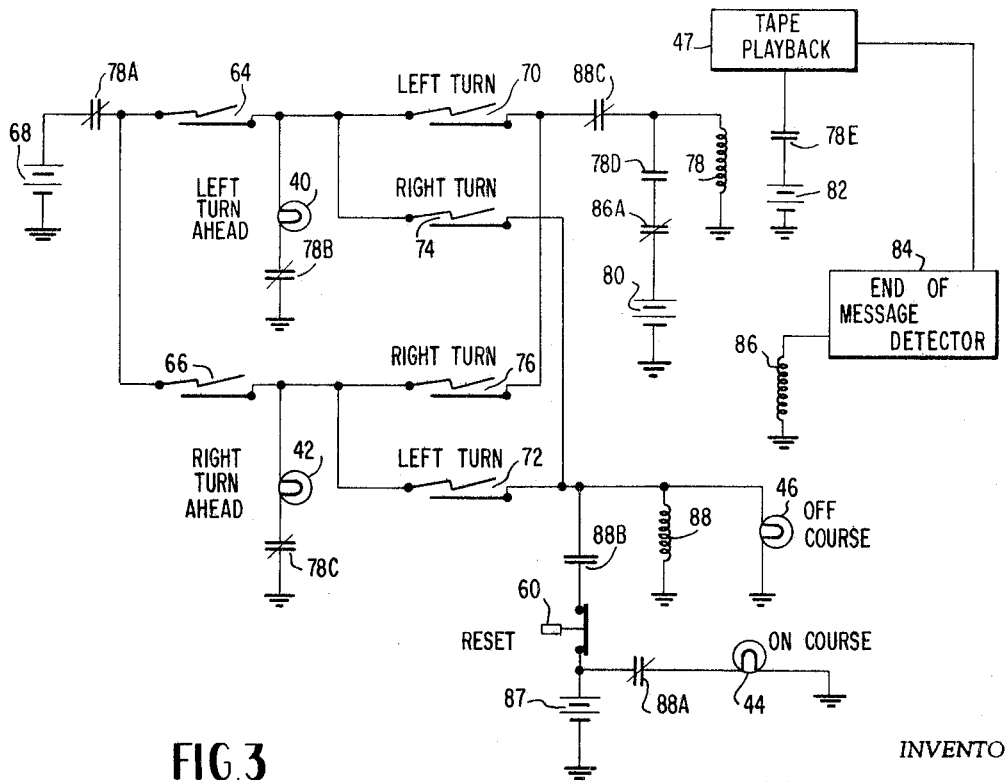
FIGURE 3 is a schematic drawing of a portion of the electronic control circuitry of the embodiment shown in FIGURE 1.

FIGURE 3 illustrates in schematic detail a portion of the electronic control circuitry 58. Relay contacts 64 and 66 may be selectively closed upon the read-off of a suitable coded configuration on the coded portion 20 of the map card 16. For instance, the contacts could be disposed on the read head 24 to be physically actuated by the occurrence of a cut-out groove 22 on the coded portion 20. Alternatively, as previously discussed, the contacts 64 and 66 could be closed in other manners well known in the art, such as in response to the outputs of magnetic or photoelectric responsive devices. Operation of one of the relay contacts 64 or 66 will serve to energize the respective current indicator 40 or 42 from the battery 68. The battery 68 may be a portable rechargeable battery or may be the vehicle battery.

Contacts 70, 72, 74 and 76 may be disposed in the turn sensor 54 to indicate the accomplishment of a vehicle turn, as previously disclosed. Contacts 70 and 72 are closed in response to a left turn, while contacts 74 and 76 are closed upon the accomplishment of a right turn. If contact 64 is closed, closure of contacts 70 and 72 will energize the relay coil 78 from the battery 68. Alternatively, if contact 66 is closed, closure of contacts 74 and 76 by the turn sensor 54 will cause the relay coil 78 to be energized through battery 68.

Energization of the relay coil 78 operates the five relay contacts 78A, 78B, 78C, 78D and 78E. Normally closed contacts 78A, 78B and 78C are opened to extinguish the energized turn indicator. The relay coil 78 is in a self-holding configuration wherein current from the source 80 keeps the relay 78 energized as long as the normally open contact 78D is closed. Closing of the normally open contact 78E energizes the playback 47 through the voltage source 82 so that a suitable audible message relating to the particular location along the route may be provided to the vehicle operator.

An end of message detector 84 may be provided to detect an audible sound or control tone frequency, or the like, placed on the record tape after the desired message is ended in order to energize a relay coil 86 from battery 82. Energization of coil 86 in turn momentarily opens the normally closed relay contact 86 to deenergize the relay coil 78 to reset the electronic circuitry for reception of another guidance command. The detector 84 may comprise any conventional sensing device and switch combination, such as a switch actuated by an acoustic transducer response to sound of a predetermined frequency. Alternatively, the switch could be actuated by a magnetic sensor which senses prepositioned magnetic configurations upon the record tape. It is noted that energization of relay coil 78 could be utilized by means of coded signals on the tape to control any of a plurality of other auxiliary devices or sequence of visual displays in addition to the tape playback system.

The on-course indicator 44 is normally energized from battery 87. However, upon an incorrect accomplishment of a commanded turn, relay coil 88 becomes energized from battery 68. Energization of relay coil 88 opens the normally closed relay contact 88A to deenergize indicator 44. After initial energization, the relay coil 88 is energized through a battery 87 by virtue of the closing of normally open contact 88B. Opening of the normally closed relay contact 88C deenergizes relay coil 78. The reset button 60 previously described must then be manually operated by the vehicle operator to deenergize the relay coil 88 and off-course indicator 46 after the vehicle is again correctly positioned on the route.

The intermittent operation of the transport motor 36 by the control circuitry may be best understood by reference to FIGURE 4. Energizing power for the motor 36 is provided from a suitable voltage source 92 through the normally closed contact 94. Contact 94 is opened by a suitable relay in response to coded media sensed by the reading head 24 in order to interrupt operation of motor 36. This stops translation of the indicator 18 and the reading head 24 along the map card 16 until the particular guidance command is correctly performed by the operator of the vehicle.

A manual start button 96 is provided to allow the motor 36 to be restarted, if desired, by manually closing the switch. A normally open relay contact 86B is responsive to the energization of the end of message detector relay 86 (FIGURE 3) to momentarily start the operation of motor 36 after the correct performance of the desired guidance command. When the read head 24 is momentarily moved away from the coded media presently being sensed, the contact 94 is again closed to opearte motor 36 to insure normal movement of the indicator 18 and the reading head 24 until the occurrence of the next coded media on the program portion 20.

The speed regulator circuit 62 comprises contacts 98 and 100 which may be manually operated or may be operated by relays responsive to coded media on the map card 16. With both contacts 98 and 100 in a normally open position, the voltage supplied to the motor 36 is divided across series connected resistors 102 and 104, thus limiting the speed of operation of the motor. Upon the closing of the contact 98, a short circuit is provided around both of the series connected resistors, thereby substantially increasing the speed of the motor 36. If an intermediate speed is desired, contact 100 may be closed to short out only the resistor 104.

It will thus be apparent that in the operation of the disclosed embodiment, the desired map card 16 is inserted into the main housing 12 and the system is initially energized. The indicator 18 will traverse the representation of the predetermined route in substantial accordance with the travel of the vehicle, thus providing a constant indication of the approximate location of the vehicle in relation to the route.

The tape playback 47 may present during this time a sound program relevant to locations along the route related to the current position of the indicator 18 to the map card 16. For instance, during a vehicle tour of a historic battleground, the tape playback 47 may present prerecorded programs concerning the battles fought along certain portions of the tour, and of the historical monuments erected along the tour. The audible program may also call attention to scenic views along the tour of particular interest. If desired, the program could include portions made up primarily of music for the pleasure of the occupants of the vehicle. Of course, many other uses of the present sound reproduction system in combination with an indexing traverse of a map will be apparent, such as prerecorded programs relating to individual works of art along a tour of an art gallery or the like.

When a predetermined turn or other guidance maneuver is to be made, audible guidance commands are provided by the tape playback 47 and then a guidance command indicator on the driver guidance panel 38 becomes energized. Movement of the indicator 18 relative to the map card 16 is interrupted until the correct maneuver is performed by the driver of the vehicle, at which time the on-course indicator 44 on the driver advisory panel 38 will be illuminated and the indicator 18 again begins its traverse along the map card 16. If a mistake in guidance should be made by the driver of the vehicle, the sensor 54 will cause the off-course indicator 46 to become energized, and the system will be deactivated until the driver presses the reset button 60 after correctly repositioning the vehicle along the route.

FIGURE 5 illustrates an alternative system utilizing the principles of the present invention, wherein the guidance system is mounted as a vehicle sun-visor 105. While the programmed guidance command features of the previously disclosed embodiment could also be incorporated into this system, it may be desired to eliminate certain of the driver guidance portions previously described.

For instance, for travel along a fairly uncomplicated scenic route, it may be desirable to provide a combined map card 106 and tape cartridge 107 which may be easily inserted into or removed from the sun-visor housing 105. A position indicator 108 may include a movable mechanical pointer 109 and a light source 110 for indicating on the map card 106 the particular location of the vehicle along the route being traveled. The indicator 108 is traversed along the edge of the map card 106 by rotation of a gear assembly 112 and motor 114, similar to that previously shown in FIGURE 1. The tape cartridge 107 is directly connected to the back of the map card 106 so that when the map card is properly inserted, the tape cartridge 107 is correctly positioned in a conventional tape playback instrument (not shown). A speaker 118 is connected to the playback to provide audible orientational and instructional information pertinent to the particular location of the vehicle along the traveled route, or if desired, a suitable musical program. An on-off switch 120 is connected between a suitable source of power and both the playback system and the moving indicator 108 in order to provide correlated operation of the visual and audio systems.

The configuration illustrated in FIGURE 5 could be mounted on the dashboard of a vehicle by a suitable clamp. A goose neck connector could be provided between the clamp and the system so that the position of the system could be selectively adjusted in accordance with the particular requirements of the vehicle operator. The positioning of the present system as a vehicle sun-visor or above the vehicle dashboard enables frequency references by the vehicle operator to the system while insuring the safety of the opeartion of the vehicle.

It will further be understood that the present invention could be enclosed in a housing suitable for carrying by a person walking through a predetermined route such as through a museum or art gallery. In such an environment, a system constructed in accordance with the present invention would provide audible information pertinent to various exhibits, in addition to providing a visual indication of the present location of the system along the route.

It will be understood that the reading head and indicator assembly of the present invention could remain stationary while the map is translated. For instance, FIG. 6 illustrates an endless map belt 121 which may be translated by rotational movement of drive shaft 122 by a suitable driving motor (not shown). A second shaft 123 is freely pivoted and supports the map belt. Projecting lugs 124 on the shaft 122 engage in corresponding slots on the map 121 to drive the map past a stationary indicator and read head assembly 126. The map may be provided with coded media 128 which are sensed by the reading head assembly 126 to provide signals to electronic control circuitry in the manner previously described. An idler shaft 130 is loaded by a spring 132 to pick up slack in conjunction with one or more idler shafts 134 in order to gain extended length of the belt for additional map display time. The endless map belt assembly may be packaged in a suitable case 136 so that it may be easily inserted and removed from a housing.

Whereas the present specification has been described in considerable detail with respect to several preferred embodiments, it is to be understood that this description is merely for purposes of illustration, and changes or variations in the described environments may be made by persons skilled in the art without departing from the true scope and spirit of this invention.

I claim:
1. A system for providing information pertinent to selected locations along a predetermined route comprising:
   orientation means including map means for presenting a visual representation of the predetermined route,
   indexing means adjacently disposed for relative movement to said map means for continuously indicating the particular location of the system along the route,
   guidance display means responsive to the position of said indexing means with respect to said map means for indicating instructions for following the predetermined route, and
   sound reproducing means for providing a sound program relevant to locations on the route responsive to the current position of said indexing means to said map means,
   said sound reproducing means including means for providing instructions for following the predetermined route responsive to the current position of said indexing means to said map means.

2. The system defined in claim 1 and further comprising:
   housing means for supporting both said sound reproducing means and said orientation means,
   power means for supplying electrical power to energize both said sound reproducing means and said orientation means, and
   switch means connected between said power means and both said sound reproducing means and orientation means for simultaneous selective energization or de-energization of both said sound reproducing and orientation means.

3. The apparatus of claim 2 wherein said orientation means comprises:
   a map belt having a visual representation of the predetermined route affixed to one side thereof,
   electric motor means operable by said power means to move said map belt relative to said housing, and
   wherein said indexing means is rigidly connected to said housing for continuously indicating on said map belt the particular location of the system with respect to the predetermined route.

4. The system defined in claim 2 wherein said orientation means comprises:
   a generally flat map card having a visual representation of the predetermined route affixed to a first side thereof, said map card adapted to be inserted and removed from said housing, and electric motor means operable by said power means,
said motor means connected to said indexing means for translating said indexing means across said map card to continuously indicate the particular location of the system along the predetermined route.

5. A system for providing information pertinent to selected locations along a predetermined route comprising:
housing means adapted to be affixed to an interior portion of a vehicle to provide audible and visual information to the operator of the vehicle,
orientation means supported by said housing means for presenting a visual representation of the predetermined route, including a generally flat map card having a visual representation of the predetermined route affixed to a first side thereof, said map card adapted to be inserted and removed from said housing means,
indexing means adjacently disposed for relative movement to said map card for continuously indicating the particular location of the system along the route,
said orientation means including electric motor means connected to said indexing means for translating said indexing means across said map card to continuously indicate the particular location of the system along the predetermined route,
sound reproducing means supported by said housing means adapted to be transported along the route for providing a sound program relevant to locations on the route related to the current position of said indexing means to said map means,
said sound reproducing means including tape playback means enclosed by said housing means, and
a record tape means adapted to be inserted into said playback means and having instructional information recorded thereon, said record tape means being attached to a second side of said map card means to form a unit insertable and removable from said housing,
power means for supplying electrical power to energize both said sound reproducing means and said orientation means, and
switch means connected between said power means and both said sound reproducing means and orientation means for simultaneous selective energization or de-energization of both said sound reproducing and orientation means.

6. The system defined in claim 5 wherein said housing is rectangular and is configured as a vehicle sun visor, and further comprising:
means attached to said housing for pivotal connection to a portion of a vehicle so that said housing may be utilized both as a sun visor and as a system for providing visual and audible information to the vehicle operator.

7. A guidance system for aiding an operator of a steerable mobile vehicle to follow a predetermined route comprising:
program means having coded configurations representing route direction guidance commands,
read head means relatively movable with said program means for sensing said coded configurations,
means operable in dependency on the coded configurations sensed by said read head means for presenting route direction guidance information to the operator of the vehicle, and
means for controlling the relative movement of said read head means with said program means in response to maneuvers of the vehicle corresponding to said route direction guidance commands.

8. The system defined in claim 7 wherein said means for presenting route direction guidance information comprises:
an advisory panel having a plurality of indicator means each representing different route direction guidance information and each having a de-energized and an energized state, and
electrical circuit means connected between said read head means and said advisory panel for selectively energizing certain of said indicator means in response to predetermined ones of said coded configurations.

9. The system defined in claim 8 wherein said means for controlling the relative movement of said read head means with said program means comprises:
sensor means connected to the guidance controls of the vehicle for providing an output in response to the accomplishment of guidance maneuvers by the operator of the vehicle, said electrical circuit means being responsive to said output for energizing certain of said indicator means to indicate the correctness of the guidance maneuvers.

10. The system defined in claim 9 and further comprising:
sound reproducing means for providing pre-recorded audible information to the operator of the vehicle, and
said electrical circuit means providing an output in response to predetermined ones of said coded configurations to selectively operate said sound reproducing means.

11. A vehicle guidance system comprising:
program means having coded configurations representing guidance commands,
read head means relatively movable with said program means for sensing said coded configurations,
means operable in dependency on the coded configurations sensed by said read head means for presenting guidance information to the operator of the vehicle including an advisory panel having a plurality of indicator means each representing different guidance information and each having a de-energized and an energized state,
electrical circuit means connected between said read head means and said advisory panel for selectively energizing certain of said indicator means in response to predetermined ones of said coded configurations,
means for controlling the relative movement of said read head means with said program means in response to the accomplishment of predetermined guidance maneuvers by the operator of the vehicle including sensor means connected to the guidance controls of the vehicle for providing an output in response to the accomplishment of guidance maneuvers by the operator of the vehicle, said electrical circuit means being responsive to said output for energizing certain of said indicator means to indicate the correctness of the guidance maneuvers,
sound reproducing means for providing prerecorded audible information to the operator of the vehicle,
said electrical circuit means providing an output in response to predetermined ones of said coded configurations to selectively operate said sound reproducing means, and
detector means responsive to predetermined signals from said sound reproducing means for interrupting the relative movement of said read head means with said program means until the successful accomplishment of a certain guidance maneuver by the vehicle.

12. The system defined in claim 11 and further comprising:
map means integrally connected to said program means to provide visual representation of a route, and
indexing means connected to said read head means for relative movement with said map in order to continuously indicate the location of the vehicle along the route.

13. The system defined in claim 12 and including a housing,
said map means comprising a relatively flat map card integrally connected to said program means and adapted to be inserted and removed from said housing,
said indexing means and said read head means being movable relative to said housing for translation across said map card and said program means.

14. The apparatus of claim 12 and comprising a housing,
said map means comprising an elongated belt having a program portion and a representation of the predetermined route affixed to one side thereof, said belt adapted to be inserted and removed from said housing,
said indexing and read head means mounted on said housing, and
means for moving said map means relative to said housing past said read head means and indexing means.

15. A guidance system for providing to the operator of a steerable mobile vehicle guidance commands pertinent to a predetermined route comprising:
program means having predetermined coded configurations representing route direction guidance commands pertinent to different locations along the route,
read head means adjacently mounted for relative movement with said program means for sequentially sensing said coder configurations,
means operable in dependency on the coded configurations sensed by said read head means for presenting route direction guidance commands to the operator of the vehicle, and
means responsive to the operation and guidance of the vehicle for indicating both correct and incorrect accomplishments of the route direction guidance commands by the vehicle operator.

16. The system defined in claim 15 and further comprising:
map means having a visual representation of the route affixed thereto, and
indexing means operable in correlation with said read head means for traversing said map means to continuously visually indicate the position of the vehicle along the route.

17. The system of claim 16 and further comprising:
sound reproducing means operable in dependency on the coded configurations sensed by said read head means for presenting audible guidance information to the vehicle operator.

18. A method for providing guidance information pertinent to a predetermined route to the operator of a steerable mobile vehicle comprising:
visually presenting to the operator sequential route direction guidance commands pertinent to different sequential locations along the route,
sensing the operation and guidance of the vehicle, and indicating to the vehicle operator both correct and incorrect accomplishments of the route direction guidance commands in order to assist in directing the vehicle along the predetermined route.

19. The method defined in claim 18 and further comprising:
presenting audible guidance commands pertinent to sequential locations along the route in correlation with said visual guidance commands.

20. The method of claim 19 and further comprising:
visually providing to the vehicle operator a representation of the predetermined route, and
continuously indicating on the representation the location of the vehicle along the route.

References Cited

UNITED STATES PATENTS

| | | | |
|---|---|---|---|
| 1,168,053 | 1/1916 | Boyden | 40—41 |
| 1,342,793 | 6/1920 | Castner | 40—41 |
| 1,572,447 | 2/1926 | Schroeder | 40—41 |
| 1,774,683 | 9/1930 | Van Horn. | |
| 2,501,048 | 3/1950 | Haller | 40—41 |
| 2,715,783 | 8/1955 | Chedister et al. | 35—11 |
| 3,078,093 | 2/1963 | Hotkins et al. | 35—11 |
| 3,171,215 | 3/1965 | Glass et al. | 35—11 |
| 3,204,358 | 9/1965 | Jones | 40—42 |
| 3,231,987 | 2/1966 | Schott et al. | 35—11 |
| 3,231,988 | 2/1966 | Freyde | 35—11 |

EUGENE R. CAPOZIO, Primary Examiner

U.S. Cl. X.R.

40—32, 53